Dec. 30, 1969     A. M. JACKES     3,486,577
AXIAL FLOW GROUND EFFECT MACHINE
Filed Oct. 21, 1965     6 Sheets-Sheet 1
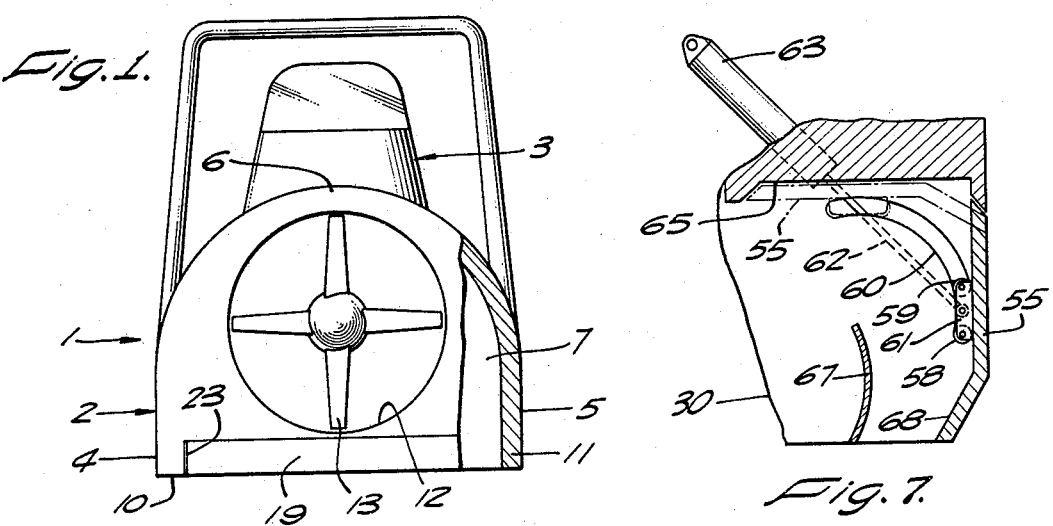
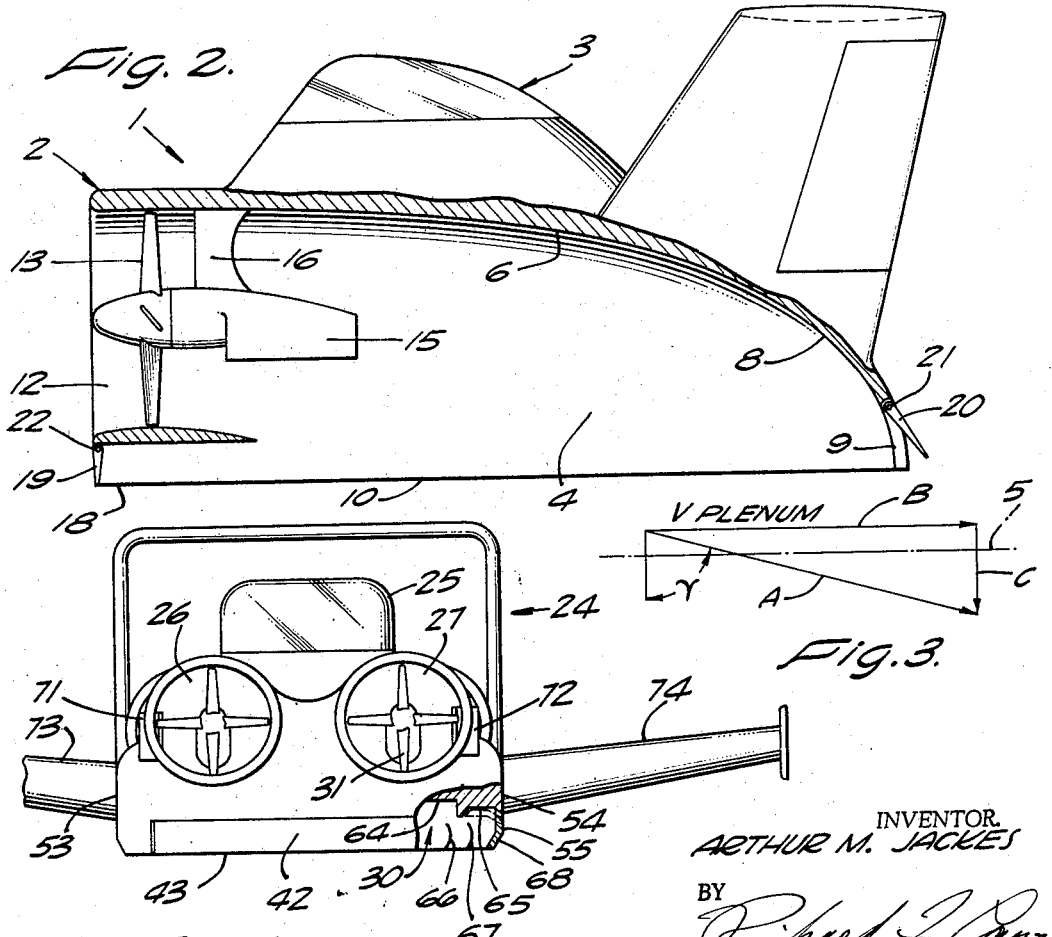
INVENTOR.
ARTHUR M. JACKES
BY
Richard F. Carr
ATTORNEY Dec. 30, 1969　　　A. M. JACKES　　　3,486,577
AXIAL FLOW GROUND EFFECT MACHINE
Filed Oct. 21, 1965　　　6 Sheets-Sheet 2

INVENTOR.
ARTHUR M. JACKES
BY
ATTORNEY

Dec. 30, 1969      A. M. JACKES      3,486,577
AXIAL FLOW GROUND EFFECT MACHINE
Filed Oct. 21, 1965      6 Sheets-Sheet 3
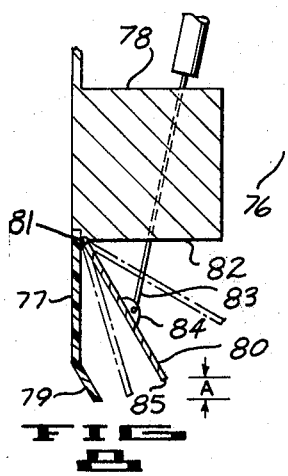
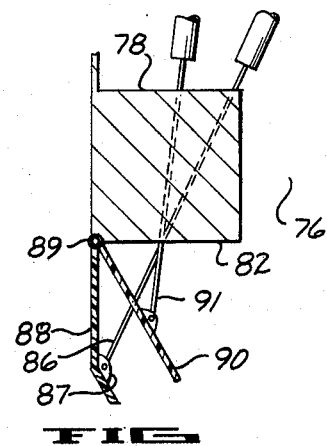
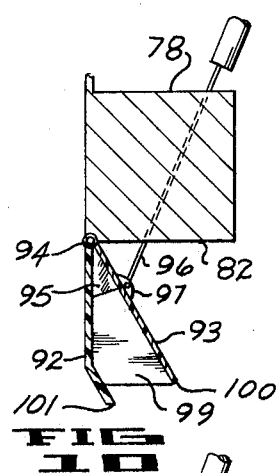
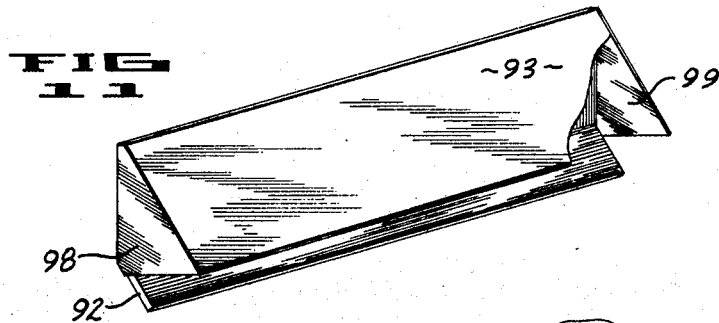
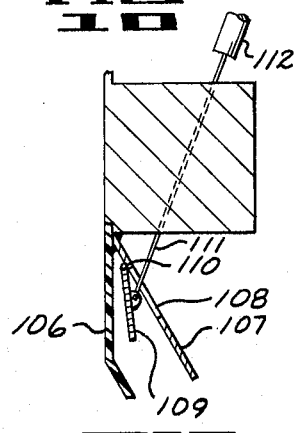
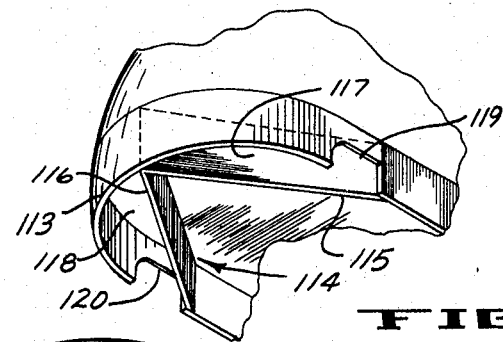
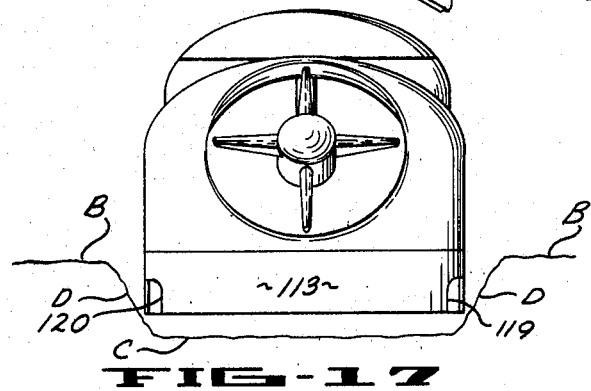
INVENTOR.
ARTHUR M. JACKES
BY
ATTORNEYS Dec. 30, 1969     A. M. JACKES     3,486,577

AXIAL FLOW GROUND EFFECT MACHINE

Filed Oct. 21, 1965     6 Sheets-Sheet 4

INVENTOR.
ARTHUR M. JACKES

BY

ATTORNEYS

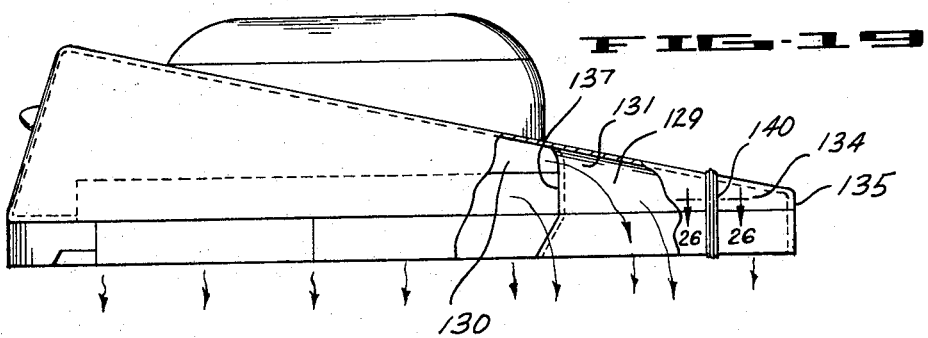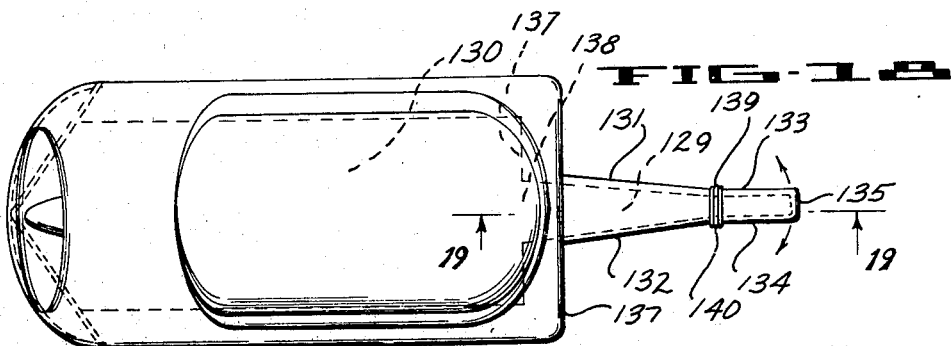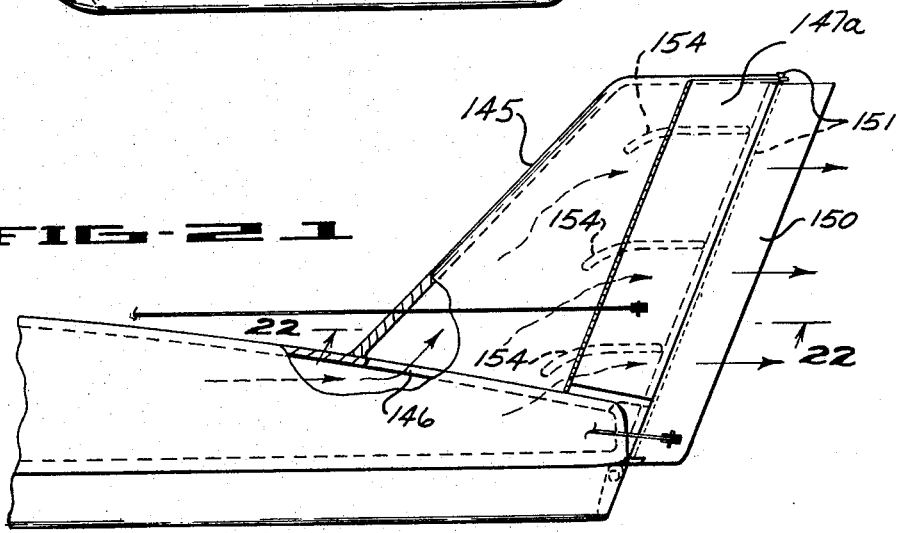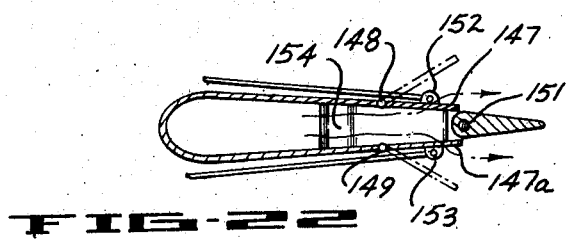

Dec. 30, 1969  A. M. JACKES  3,486,577
AXIAL FLOW GROUND EFFECT MACHINE
Filed Oct. 21, 1965  6 Sheets-Sheet 6
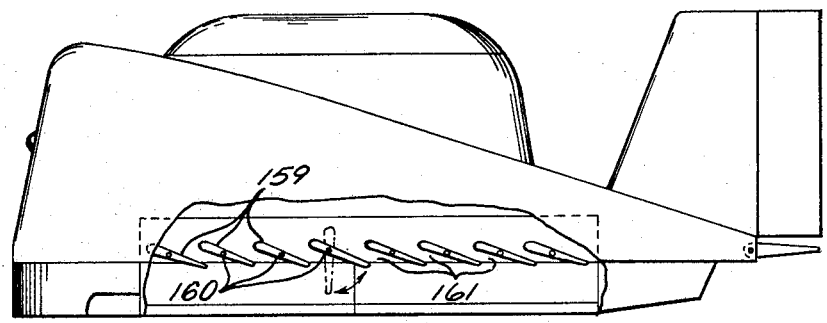
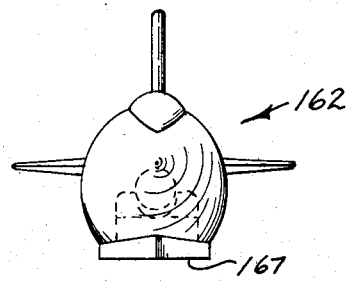
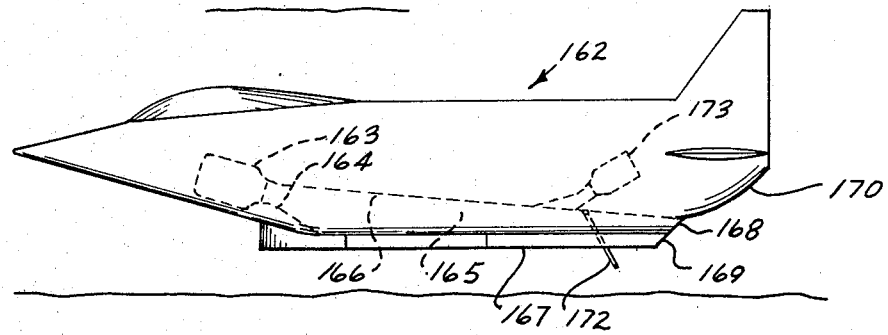
INVENTOR.
ARTHUR M. JACKES
BY
ATTORNEYS

United States Patent Office 3,486,577
Patented Dec. 30, 1969

3,486,577
AXIAL FLOW GROUND EFFECT MACHINE
Arthur M. Jackes, 11071 Arroyo Ave.,
Santa Ana, Calif. 92705
Continuation-in-part of application Ser. No. 232,161, Oct. 22, 1962. This application Oct. 21, 1965, Ser. No. 507,603
Int. Cl. B60v 1/16
U.S. Cl. 180—120    29 Claims This is a continuation-in-part of my co-pending patent application Ser. No. 232,161, filed Oct. 22, 1962, for Axial Flow Ground Effect Machine, and since abandoned.

This invention pertains to an integrated lift, propulsion and control arrangement for vehicles utilizing ground effect.

Ground effect machines have certain obvious advantages in enabling a vehicle to be constructed that traverses nearly any type of terrain without actually touching it. Being suspended on a cushion of air, a ground effect machine can cross over sand, mud, water, swamps or other areas where conventional vehicles could not travel satisfactorily. However, to date these machines have not been of appreciable practical value due largely to their inherent inefficiency. Additionally, accurate controlling of such vehicles is difficult.

The normal ground effect machine utilizes some kind of fan for directing air at high speed downwardly to entrap air under pressure between the vehicle, the surface below, and the surrounding air jet. Forward thrust usually is obtained by deflecting the downwardly moving jet of air toward the rear. However, the magnitude of thrust so developed and the efficiency of this means of propulsion are such that it is necessary normally to use auxiliary propellers for forward thrust. The power applied to auxiliary engines and propellers is not easily available to produce lateral control forces, or extra lift when required. Thus, the normal ground effect machine does not embody integrated lift and propulsion, which is the ability to apply all the available power, at will, to produce either lift, thrust, or lateral force. Also, the use of high velocity jets with the conventional ground effect machine necessarily limits the efficiency of such vehicles. A fundamental principle of aerodynamics is that lifting and propulsive efficiencies are high only when the lifting and propelling streams about a vehicle are subjected to small changes in direction and velocity compared with the free stream. The high speed jets of the usual design require considerable increase in velocity from that of the free stream. For lift these air jets leave the vehicle approximately at right angles to the free stream direction. This is inherently wasteful of energy. Additional losses are also encountered initially in turning the air from the free stream direction to the vertical. Hence, the basic requirements for efficiency are violated in a normal ground effect machine, by the high speed and high angularity of the lifting jets compared to the free stream velocity and direction.

The present design, however, provides a ground effect machine having much greater efficiency than prior designs. It includes a plenum chamber having a substantially vertical inlet at one end and an outlet at the lower portion of the opposite end. A fan located at the front drives a large mass of low velocity air through the plenum chamber in the same direction as the free stream flow, producing lift and thrust without greatly changing the velocity or direction of the air. Leakage past the side edges is small as the vehicle moves forwardly. This design also provides fully integrated lift and propulsion, since all the air flowing through the fan may be used to produce lift, or thrust, in any desired combination. It is also used to provide lateral, or control force by rolling the vehicle. All the available power may be used to generate side force, if required for control. Control means are included in conjunction with the plenum chamber, permitting effective control of the thrust, pitch, roll and yaw.

Exposed auxiliary propellers are not necessary, thus eliminating a source of noise, hazard and complication. Further, a completely enclosed fan (ducted propeller) is in any case a more efficient source of thrust than an exposed propeller of the same size, since the shroud (duct) prevents the losses ordinarily occurring at the tips of a propeller.

The present invention also incorporates improved means for effecting control and stability of the craft. This includes dual skirt assemblies at the bottom edges of the lift chamber, these being of flexible material and extending beneath the hard structure. These skirts provide automatic stabilizing, and their relative heights are adjustable to act as controls. The dual skirts also provide for effective dust and spray suppression. The craft may also include an auxiliary lift chamber that functions as a keel and rudder as well as augmentation of conventional controls by air bleed over them. Vanes across the bottom of the lift chamber may be used to vary the area of air discharge for the lift chamber, or to alter the air flow direction. The vehicle is also adaptable for high velocity flight through rocket or atmospheric jet propulsion.

Therefore, it is an object of this invention to provide a ground effect machine of greatly improved efficiency with integrated lift, propulsion and control.

Another object of this invention is to provide a ground effect machine having reduced power requirements with increased vehicle velocity.

An additional object of this invention is to provide a ground effect machine having a relatively low drag.

Yet another object of this invention is to provide a ground effect machine having improved control arrangements.

These and other objects will become apparent from the following detailed description taken in connection with the accompanying drawing in which:

FIGURE 1 is a front elevational view of a ground effect machine utilizing the principles of this invention;

FIGURE 2 is a longitudinal sectional view of the machine of FIGURE 1;

FIGURE 3 is a vector diagram illustrating the air flow at the side edge of the plenum chamber;

FIGURE 4 is a front elevational view of the invention as used with larger vehicles;

FIGURE 7 is an enlarged fragmentary elevational view of a means for moving and guiding the side roll control flaps;

FIGURE 8 is a fragmentary enlarged transverse sectional view of a side portion of the vehicle with a modified side skirt arrangement;

FIGURE 9 is a view similar to FIGURE 8 in which two pivotal skirts are provided at the side of the vehicle;

FIGURE 10 is a view similar to FIGURES 8 and 9 of a further modification in which both inner and outer skirts pivot together;

FIGURE 11 is a perspective view of one of the skirt assemblies used in the arrangement of FIGURE 10;

FIGURE 12 is a fragmentary sectional view of an additional side skirt construction in which a spoiler vane is provided in the inner skirt;

FIGURE 16 is a fragmentary perspective view of the forward underportion of the vehicle, illustrating the dual front skirt construction;

FIGURE 17 is a front elevational view of the vehicle having the dual front skirt feature;

FIGURE 18 is a top plan view of a ground effect machine utilizing an auxiliary pressure chamber that acts as a keel;

FIGURE 19 is a longitudinal sectional view taken along line 19—19 of FIGURE 18;

FIGURE 21 is a fragmentary elevational view of a vertical stabilizer and rudder assembly in which some air from the lift chamber exhausts through the stabilizer to augment the vehicle controls;

FIGURE 22 is a sectional view taken along line 22—22 of FIGURE 21;

FIGURE 23 is a side elevational view, partially broken away, showing a vehicle utilizing an array of adjustable vanes at the bottom portion of the lift chamber;

FIGURE 24 is a front elevational view of a vehicle adapted for supersonic flight;

FIGURE 25 is a longitudinal sectional view taken along line 25—25 of FIGURE 24;

FIGURE 26 is an enlarged fragmentary sectional view taken along line 26—26 of FIGURE 19, showing the pivotal connection for the aft portion of the lift chamber;

FIGURE 27 is a plan view of an embodiment of the invention incorporating various of the structural features discussed above;

FIGURE 28 is a side elevational view, partially broken away, of the embodiment of FIGURE 27;

FIGURE 29 is a fragmentary perspective view of the forward portion of the vehicle of FIGURE 27; and FIGURE 30 is a fragmentary bottom plan view of the rearward portion of the vehicle of FIGURE 27.

Figure 5:
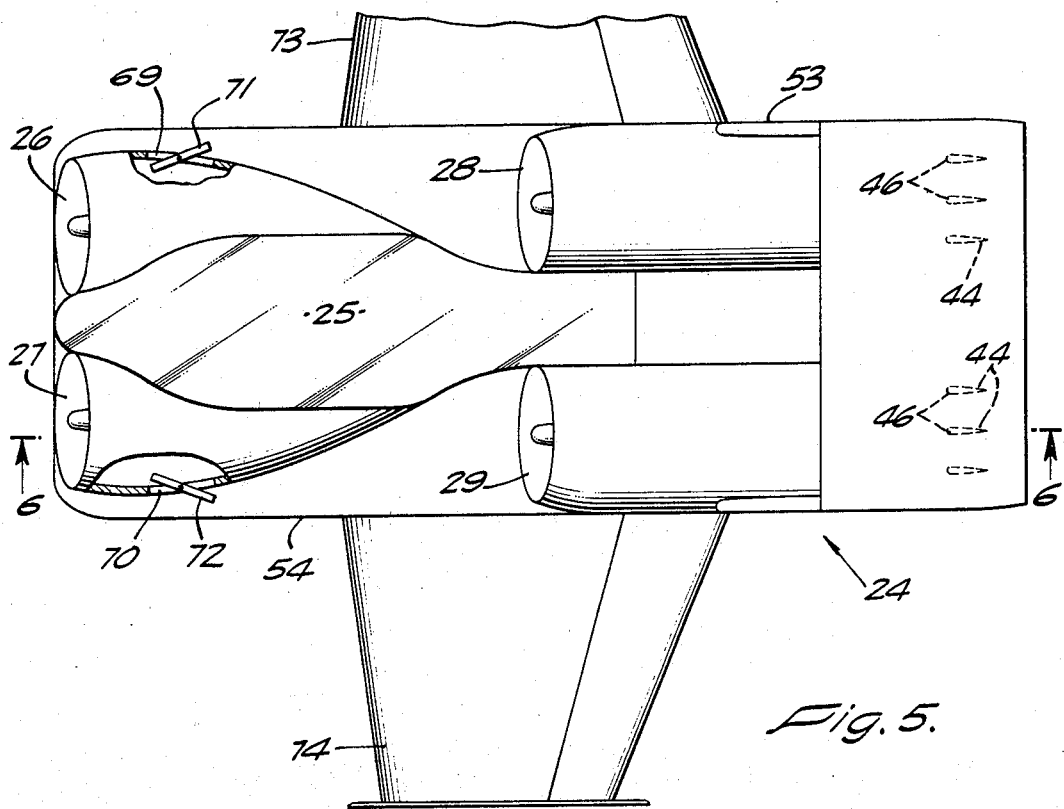
FIGURE 5 is a top plan view of the arrangement of FIGURE 4.

With reference to the drawing, the basic components of the invention may be seen by reference to FIGURES 1 and 2. This includes a vehicle 1 having a propulsion section 2 at the lower portion of the vehicle, while any desired type of passenger compartment 3 may be included above it. The section 2 is hollow, having side walls 4 and 5 and top wall 6 that define a chamber 7. The bottom of this chamber is open. At the rear of chamber 7 there is an end wall section 8 that leaves an opening 9 adjacent the bottom edges 10 and 11 of the side walls 4 and 5. At the forward end of chamber 7 is a substantially vertical opening 12 that is relatively large with respect to the lateral dimensions of the chamber 7. Preferably, the opening 12 is circular in contour and has mounted therein a fan or propeller 13. The tips of the propeller 13 extend to a position closely spaced from the inner periphery of the opening 12. The fan 13 may be rotated by a prime mover within a nacelle 15 held in the chamber by means of a strut 16. The prime mover may be a conventional reciprocating engine, gas turbine engine, or other power plant as desired.

It can be sen from the foregoing, therefore, that upon rotation of the fan 13 air is drawn through opening 12 into the relatively large volume defined by chamber 7 of the unit, which acts as a plenum chamber. As the air enters the chamber is diffuses to fill the volume of the vehicle section 2 over the surface beneath it. The air flows substantially horizontally through the chamber 7, leaving through the rearward exit aperture 9. The diffused pressurized air within chamber 7 produces an upward component of force on the upper wall 6, thereby producing a lift on the vehicle 1. In addition, the air jet exhausting through aperture 9 provides a propulsive thrust for the vehicle.

This relatively simple type construction yields several significant advantages. In the first place, instead of using a relatively small high speed stream of air, this design operates with a large quantity of low velocity air. This results from the use of the plenum chamber having air drawn in through a sizable inlet opening. Additionally, the air passing through the vehicle is given little deviation in direction. The air flow is substantially horizontal through the chamber 7 following approximately the line of flight. Accordingly, the air entering and leaving the device of this invention experiences little change in direction or velocity, permitting efficiency to become quite high.

Another advantage lies in the fact that leakage around the side edges 10 and 11 of the plenum chamber is small as the vehicle proceeds in its line of flight. The flow of air escaping past the side edges retains the axial component of velocity with which it travels through the plenum chamber. This is shown vectorially in FIGURE 3. It can be seen in this diagram that the air actually will accelerate to the side while retaining its initial rearward velocity component. The air jet at the side edge, represented by vector A, has the rearward component of vector B, which is the plenum chamber velocity. The air movement to the side is shown by the vector C, so that the resultant vector A inclines rearwardly at the relatively large angle gamma. Hence, the resultant jet velocity, instead of escaping normal to the sides of the vehicle, is directed primarily to the rear and significantly adds to the thrust of the vehicle, while the component laterally to the side is relatively small. Moreover, vector C does not change appreciably with vehicle speed since it depends on the weight of the vehicle, while vectors A and B both increase due to forward motion. Hence, angle gamma increases with vehicle velocity. This means that the greater the speed of the vehicle, the smaller will be the proportionate part of the air which will escape under the side edges.

Any loss from flow outwardly past the front edge 18 of the plenum chamber is quite small and reduces as vehicle velocity becomes greater. Such escape of air, of course, would be in opposition to the direction of movement and is to be avoided as much as possblie. Leakage under the front edge is minimized even at relatively low speeds due to an effect similar to that of a Borda mouthpiece. The initial rearward direction given the air as it enters the plenum chamber causes it to contract in cross section immediately upon discharge into the chamber, and immediately upon turning to flow forward. The result is little tendency for any substantial quantity of air to flow outwardly past edge 18. However, the reverse flow of air present at edge 18 does cause a locally reduced air pressure. Therefore, it is preferable to discharge the air into the chamber near the front of the vehicle in order to maintain efficient lift. For this reason, it is advantageous to locate the fan near edge 18.

As velocity increases, the ram pressure also reduces leakage past front edge 18, while increasing plenum chamber pressures so as to reduce the power requirements of the machine. Ram pressure will entirely eliminate forward leakage at higher speeds and permits pressure recovery within the plenum chamber resulting in an increased jet velocity for a given power input. As a consequence, the vehicle can be given increased ground clearance as it moves more rapidly. Also, as the angle gamma of the air escaping at the sides becomes larger as speeds become greater, the air escaping at the sides contributes even more to the net thrust realized.

This vehicle, therefore, has the advantage of decreasing power requirements as velocity increases. The vehicle can rise to much greater heights than conventional ground effect machines, there being theoretically no top limit. Even taking into account practical considerations, heights of up to one-half the vehicle length can be achieved. The ability to ride higher than ordinary ground effect machines is advantageous in passing over rough terrain or over a body of water where there are high surface waves. Danger of contact with the surface beneath the vehicle can be obviated.

Thrust control for the vehicle 1 is effected in part by means of a movable flap 20 at the rearward opening 9. This flap is horizontally hinged by means of pivotal mounting shaft 21 and hence extends laterally across the width of the plenum chamber, movable about an axis falling along the upper edge of the opening 9. It can be seen that, when the flap 20 is in the fully raised position, the opening 9 will be enlarged to a maximum dimension, permitting highest thrust values and greatest forward velocity. Lowering of the flap 20 will slow down the vehicle as less of the air can escape through the rearward end. With the flap 20 fully lowered, it is possible for the vehicle to hover or actually move in the reverse direction.

Another form of thrust control is effected by means of a movable flap 19 located at the front wall of the plenum chamber. This flap is horizontally hinged by means of a pivotal mounting shaft 22 that extends laterally across the width of the plenum chamber and movable about an axis falling along the upper edge of the opening 23. It can be seen that, when this flap is rotated to the rear and upwards, it provides an opening for air flow at the front of the chamber. At low speeds an increased flow of air will leave the front of the chamber through this opening, by means of which a reverse thrust is obtained for braking or backing. At high vehicle speeds the ram pressure of the free stream air exceeds that within the chamber. Hence, under such conditions air will flow in through this opening without passing through the fan. This admitted free stream air augments the lifting action of the fan air flow and it is beneficial to increase the height of the vehicle, to reduce the applied power for economy, or to make more power available for thrust to higher speeds.

It is also clear that raising the front flap 19 and the rear flap 20 will have the further advantage that the central portion of the vehicle is removed farther from the surface below the vehicle to reduce the possbility of impact with the surface.

Figure 6:
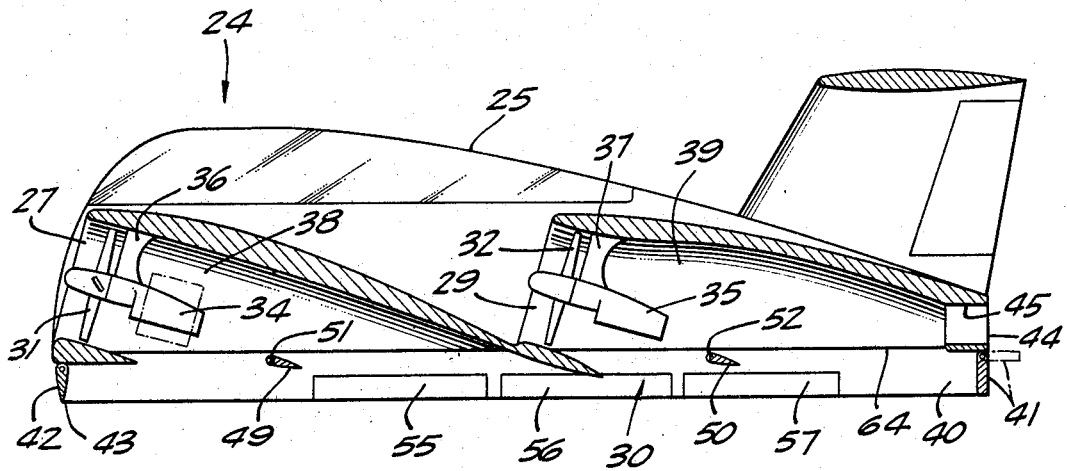
FIGURE 6 is a longitudinal sectional view of the vehicle taken along line 6—6 of FIGURE 5.
Figure 13:
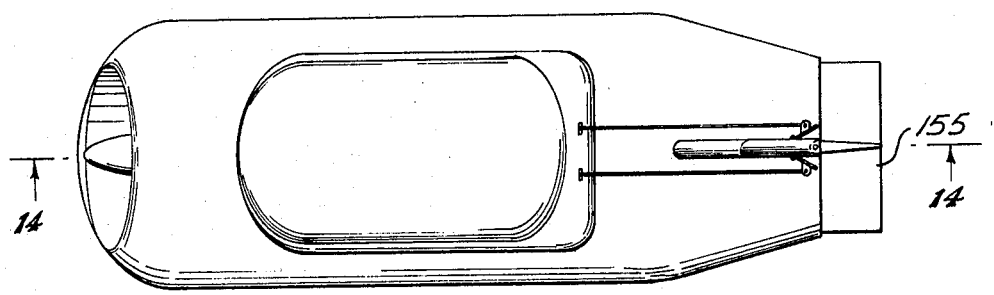
FIGURE 13 is a top plan view of a modified form of the ground effect machine of this invention.

The design of this invention is applicable to vehicles of various sizes. For larger vehicles a plurality of engines may be used. The engines may be associated in a side-by-side laterally displaced arrangement, or they may be carried one behind the other, depending on the particular requirements of the vehicle involved. In the design of FIGS. 4, 5 and 6 a combination of these techniques is utilized. Here the vehicle 24 is powered by four engines, mounted in two pairs, one behind the other. Thus the vehicle 24, which is larger than the vehicle 1 in the previously described embodiment, includes a centrally located pilot and passenger compartment 25. At the forward end of the vehicle are laterally displaced air intakes 26 and 27 located one on either side of the compartment 25. Aft of these air intakes is a similar pair of openings 28 and 29. A ducted fan is included in each of these air inlets serving to draw air inwardly for discharge into a common plenum chamber 30. As shown in FIG. 6 for the left-hand side of the vehicle (the right-hand being similarly constructed), fans 31 and 32 are positioned in openings 27 and 29 generally in the same manner as the fan 13 previously described. These fans are powered by engines carried in pods 34 and 35. The latter elements are suspended by struts 36 and 37 in ducts 38 and 39. Air from the ducts discharges into a single plenum chamber 30 at the lower side of the vehicle. As before, there is a rearward exit aperture 40 through which the air from the plenum chamber exhausts in providing a thrust to propel the vehicle. Horizontally hinged flap 41 controls the area of the jet exit aperture. A second horizontally hinged flap 42 controls the aperture in forward edge 43.

It may be noted that the ducts 38 and 39 forming the entrances to the plenum chamber are inclined downwardly with respect to the horizontal at a relatively shallow angle rather than being entirely horizontal as in the previously described embodiment. This is to permit a plurality of the engine-fan assemblies to be mounted one behind the other without unduly increasing the frontal area of the machine. If the engines were mounted one above the other, an ungainly vehicle of high drag would result. The construction of this embodiment also facilitates the discharge of several fans into the common plenum chamber 30. Furthermore, it assists in positioning the inlet ducts above the lower edge of the vehicle, which may be desirable where the vehicle is intended to be operated over water. The possibility of water spraying upwardly into the inlets is minimized.

Nevertheless, despite this angular positioning of the fans and inlet passageways, the path of the air is substantially horizontal and is inclined toward the exit aperture 40, permitting the air to follow virtually a straight path as it is pumped into the vehicle by the fans.

As illustrated, additional control provisions are incorporated into the larger vehicle of FIGS. 4, 5 and 6 to assist in maneuevering of it. In actual practice it may be preferred to install all or only a portion of these controls, depending upon the particular vehicle involved.

In order to control yaw of the vehicle, one or more vertically arranged vanes 44 are included at the aft end of the vehicle. These vanes are positioned across a lateral end opening 45 directly above the exit aperture 40 that includes the thrust control flap 41. Each of the vanes is rotatable about a vertical pivot axis 46 where it is mounted by suitable hinge pins. Hence, vanes 44 may be turned in the manner of a rudder of a conventional airplane and control the yaw of the vehicle.

For pitch and roll control additional vanes 49 and 50 are included in the ducts 38 and 39, while a similar pair is provided in the opposite side in the air intake ducts. These vanes are pivotal about horizontal mounting shafts 51 and 52. Normally, the vanes 49 and 50 are positioned, as illustrated in solid lines, where they offer no appreciable obstruction to the flow through the ducts, nor do they influence the direction of the path of the air therethrough. For pitch control, however, the vanes 49 and 50 may be pivoted upwardly or downwardly to cause the vehicle either to nose down or nose upwardly. Roll of the vehicle can be accomplished by opposite movement of the vanes on the opposite sides of the center section 25.

An additional provision for both pitch and roll control, and for stability, may be seen in particular by reference to the transverse sectional view of FIG. 4, as well as the enlarged detail of FIG. 7. Along the bottom of the vehicle sides 53 and 54 are opposed pairs of longitudinally elongated vanes 55, 56, and 57. These vanes are mounted in the vehicle so as to be movable to the positions indicated in phantom. One method of accomplishing this is to mount the ends of the vanes on rollers 58 and 59 which are received in an arcuate guide 60, as seen in FIG. 7. The rollers are connected together by means of a link 61 that in turn is pivotally joined to rod 62 of hydraulic cylinder 63, pivotally mounted to fixed structure of the vehicle. Therefore, upon retraction of the rod into the cylinder 63 the rollers are caused to follow the path of the guide 60, thereby pivoting the vanes upwardly to the phantom line position.

With the vanes in a retracted position, they present a lower surface at the edge of the vehicle which is below the normal bottom wall 64 of the plenum chamber. The effect is a type of restricted passageway so that as the air reaches the edge of the vehicle, it will pass under the vane at a higher velocity as it expands to the atmosphere. The result is a decreasing pressure beneath the vane causing the vehicle to lose a portion of its lift at the side where the vane is raised. Conversely, by lowering the vane the opposite effect is caused, increasing lift at the side where the vane is lowered. Thus by differentially raising and lowering the central two vanes 56, the vehicle may be caused to roll as desired. Also by differentially raising pair 55 at the front, and pair 57 at the rear, the vehicle may be caused to pitch as desired. It may be noted that changing the roll attitude of the vehicle in this fashion results in increased air flow past one side of the chamber and decreased air flow past the opposite side edge, which therefore produces a sideward thrust force to change the direction of travel of the vehicle. Forward thrust may also be changed similarly by changes in pitch attitude.

The action of these control flaps, in which the lift along selected portions of the sides of the vehicle is caused to change, also illustrates the means for providing inherent stability of attitude. The horizontal surface 65 along the sides, into which these vanes (or flaps) retract when elevated, is below the normal bottom wall 64 of the plenum chamber. The lift on this edge surface 65 is therefore caused to change more rapidly than that on bottom wall 64 by a change in ground clearance. Thus if one side of the vehicle approaches the ground, increased lift on that portion of surface 65, and decreased lift on the portion of surface 64 on the opposite side of the vehicle, act to return the vehicle to a level attitude, without the necessity for actuation of the controls.

Although leakage at the side edges is minimized by the design of this invention, an additional feature may be incorporated to reduce the amount of air flowing outwardly at that point still further. This may be accomplished by means of spoiler vanes running lengthwise of the vehicle and spaced inwardly of the side edges. Hence, as seen in FIGURE 4, arcuate spoiler vanes 66 and 67 are located at the bottom edge of the plenum chamber, extending longitudinally of the vehicle in a spaced relationship with the side wall. Therefore, as a portion of the air flows laterally toward the side wall and contacts the vanes 66 and 67, it is turned inwardly by the curving surface presented by the vanes and deflected back toward the center of the plenum chamber. The side edges of the vehicle, which may be formed by the roll control flaps or may be rigid as desired, are inwardly inclined at their bottom edge portions 68, likewise tending to direct the air back toward the axis of the plenum chamber.

Still another type of yaw control may be included in the form of ports 69 and 70 on either side of the vehicle at the intake ducts, controlled by vertically pivoted flaps 71 and 72. These ports maye be selectively opened to control direction of the vehicle, or may be opened together for braking, by being pivoted forwardly to give a thrust reversal. When the vanes are positioned as shown the exhaust from ports 71 and 72 contributes forward thrust to the vehicle.

The ground effect machine of this invention may be designed to fly as an airplane, rather than obtaining all its lift from ground effect, at higher velocities. Hence, the design of FIGS. 4, 5 and 6 includes wings 73 and 74 for securing lift as speed increases.

It can be seen from the foregoing that I have provided a ground effect machine operating on a different principle from that of the conventional vertical jet variety. It is a relatively simple design, yet gives vastly improved results in efficiency of lift and propulsion. Power requirements are reduced and maximum velocity is increased. Also, the vehicle may rise to greater heights than in the usual design. In addition, it is possible to include controls in the vehicle which while uncomplicated in nature assure that the vehicle may be operated with precision.

These features are combined in a vehicle with integrated lift, propulsion, and control, which does not require an exposed propeller or other auxiliary propulsion means.

In the arrangement described above, the roll attitude of the vehicle was made stable through the use of the lowered side edge plenum chamber surface 65 which, as set forth, provides an area above the bottom edge of the side flap 55, against which the pressure could react to exert a force upwardly on the side portion of the vehicle. Being below the normal bottom wall of the plenum chamber, the side surface causes a more rapid change in lift upon variation in ground clearance. This added sensitivity and reaction at the sides of the vehicle results in an inherent stability, permitting the vehicle to right itself without operation of the controls. Also, the attitude may be varied through the movement of the side flap 55, which can be retracted upwardly. If the side flap is moved upwardly, it increases the velocity of the air escaping at the side of the vehicle, with an attendant reduction in pressure and reduced lift at that location. This permits the variable side vanes to be used as attitude control means for the craft.

Normally, it is necessary to make the bottom wall of the plenum chamber of a rigid material. For example, the portion of the craft above the surface 65 may be a float to provide buoyancy for the craft, permitting it to ride in the water. However, a desirable feature for a ground effect machine is a provision of flexibility at the lower part of the vehicle. In other words, the side flaps 55 preferably are made flexible so that when an obstruction is encountered the flap may be deflected if the vehicle height is insufficient for the craft to clear the object beneath it. The flexibility avoids damage to the part that engages the obstruction as the craft passes over it. However, a float or other such portion of the plenum chamber normally cannot be made of a flexible material. Therefore, with a rigid horizontal element positioned at the edge of the craft for stability and control, there is always danger of damage to the aircraft from contact with protruding obstacles beneath.

According to the construction of FIGURE 8, basically the same effect is realized as that shown in FIGURES 4 and 7, where the rigid horizontal surface 65 provided a surface for localized lift at the edges. Instead, however, the depending portions of the device at the side edges may be constructed of a flexible material, so that no damage to the vehicle will occur if obstructions are encountered beneath it. The rigid structure is located sufficiently far above the bottom edge of the craft to be safe from damage by objects under the craft. In this arrangement, outwardly of the plenum chamber 76 there is a skirt 77 of flexible material extending longitudinally of the craft at its side edge. This skirt 77 depends from a rigid float 78 or other hard structure of the vehicle at the side portion of the chamber 76. The bottom portion 79 of the skirt 77 is inclined inwardly toward the longitudinal axis of the craft, as illustrated in FIGURE 8. In addition, a second skirt 80 is provided, this being pivotal about a hinge 81 extending longitudinally along the juncture between the outer skirt 77 and the bottom surface 82 of the float 78. The skirt 80 also is of flexible material. Rotation of the skirt 80 is effected in a suitable manner, such as by a member 83 connected to a fitting 84 on the inner skirt 80 and extending to a suitable power cylinder. Rather than being a rigid extension of the piston rod of the piston cylinder, the member 83 may be a cable or other flexible element to avoid damage when obstructions are encountered. Such a flexible member can provide for rotation of the skirt 80 because the internal pressure of the vehicle will always push the skirt 80 downwardly and outwardly. Therefore, the inner skirt 80 is rotated upwardly, counter-clockwise as shown in FIGURE 8, by pulling on the flexible member 83, while clockwise movement of the skirt 80 is caused by internal pressure when the power cylinder holding force is relaxed.

In this construction the flexible side vanes 77 and 80 are made larger than the side vanes 55, and extend considerably below the bottom wall 82 of the rigid portion 78 of the craft adjacent the side edge. Hence, if an obstruction will be encountered, both the flaps 80 and 77 will deflect, but the higher rigid element 78 will not be affected.

It may be noted that in the solid-line position of FIGURE 8, the bottom edge 85 of the pivotal skirt 80 is vertically higher than the bottom edge 79 of the fixed skirt 77. As air escapes to the side of the vehicle, it will expand from the plenum chamber pressure inwardly of the skirt 80 to atmospheric pressure outside the fixed skirt 77. Intermediate the two skirts 80 and 77, however, a pressure below the plenum chamber pressure but higher than atmospheric pressure is realized. If the side of the craft should fall, the pressure between the two skirts will rise rapidly. The downward movement at the side of the craft will cause this pressure between the skirts to increase to that within the lift chamber because of the approach to the surface beneath the craft. At the same time, if the opposite side is being raised so that a greater clearance is effected beneath it and the surface below, the pressure between the two skirts on that side will decrease and approach atmospheric. This comes about because the surface beneath the rising side no longer will confine the air at the space between the inner and outer skirts, allowing full pressure drop as the air escapes past the bottom 85 of the inner skirt 80.

Consequently, the same effect is achieved as where the horizontal plenum chamber edge surface is present as in the embodiment of FIGURE 7. Even though the horizontal surface 82 at the edge of the craft is relatively high above the bottom edge of the outer skirt, it has an apparent height much lower. This height is at the level of the bottom edge 85 of the inner skirt 80 in view of the intermediate pressure that is present between the skirts 80 and 77. In other words the existence of the localized presure at the side edge, increasing as the edge drops, provides an increasing lift force on the horizontal surface 82 spaced some distance above it. The effect on the craft is substantially the same as if the surface 82 were lower than its actual height and positioned at the level of the bottom edge 85 of the inner skirt 80.

Thus, even though the hard structure of the craft is at a relatively great height above the bottom edge of the outer skirt, the craft will stabilize as before. The advantages of the flexibility of the lower edge portions of the vehicle, together with the stabilizing effect of a localized reduced chamber height at a side edge, are both realized by this arrangement.

Control of the craft illustrated in FIGURE 8 may be achieved by varying the height of the inner skirt 80. This is because the pressure between the two walls for a given surface clearance depends only upon the difference in their lengths. In other words, the vertical distance A for the solid-line position of FIGURE 8, which is the difference in the height of the bottom edges 85 and 79 of the inner and outer skirts is what establishes the pressure between them and hence the apparent height of the horizontal surface. By changing the height of the inner skirt relative to the outer, the pressure between the two skirts will be changed. This variation is caused by pivoting the inner skirt 80 about the hinge 81 by actuating the control member 83. Different positions, both up and down from the solid-line position, are shown in phantom in FIGURE 8.

If the inner wall 80 is elevated relative to the outer skirt 77, there is a lower velocity of air across the space between the skirts. This lower speed is accompanied by an increase in pressure, so that the pressure between the two skirts becomes greater. Conversely, if the inner skirt is moved downwardly to a lower position, air speed at the space between the skirts increases and a lower pressure is experienced. Thus, to lower the side of the craft, the inner skirt 80 is pivoted downwardly which decreases the apparent height of the horizontal surface. There is then a lower pressure across the space between the skirts so that the side of the craft will drop downwardly. Obviously, to raise the side of the craft, the inner skirt 80 is pivoted upwardly. This reduces the velocity and increases the pressure at the side. Complete control of the craft may be retained with the use of the two flexible skirts as in this embodiment of the invention.

It may be noted that as this inner skirt 80 is pivoted the lateral spacing between the edges 79 and 85 will also vary. This changes the apparent width of the plenum chamber edge at the same time that the apparent height is being controlled. The width becomes greater as the height increases, and smaller as the edge is lowered. The change in apparent width, however, has much less effect than the change in apparent height so that the height variation controls the vehicle as noted above despite some relatively slight increase in the control action from the apparent width variation.

An additional advantage is realized from the inwardly inclined side skirts, adding to the stability when the craft is riding upon a displacement bubble of air. A condition will occur when the plenum chamber is first pressurized where the craft will be raised as the pressure in the plenum chamber depresses the surface of the water beneath the chamber. This will elevate the floats clear of the water so that they do not contribute stability. However, stability is accomplished through the inwardly inclined skirts at the side edges of the chamber. The outer skirt may be vertical down to the level of the lower edge of the inner skirt, below which it must be inclined inwardly to effect stability under these conditions.

The stabilization depends upon the lifting action of the displacement bubble of air. This is the volume of air under pressure below the free water level, open to water from below. The lower boundary of the displacement bubble always is essentially parallel to the free water surface. If the craft tilts, the displacement bubble will move up the skirt on the downgoing side. Due to the inclination of the skirt at that side, the bubble will be increased in lateral dimension as it travels up the skirt. The opposite effect occurs on the upgoing side, where the displacement bubble moves down the inclined skirt and becomes of smaller lateral dimension. Consequently, lift is increased on the downgoing side and is reduced on the upgoing side. This provides a moment to stabilize the attitude of the craft, returning it to a level condition. The amount of stability in this regard may be controlled by selecting the angle of inward slant of the skirts at the side edges. This effect will be realized with a single side skirt construction where the lower plenum chamber edge slants inwardly. With dual skirts as described, the outer skirt can also contribute to stability as the craft begins to rise.

It may be noted that this does not reduce the air cushion lifting capability, because the outer skirt need not slope inwardly until below the level of the inner skirt. Also, it does not reduce the air cushion or floating stabillity characteristics.

While only the inner skirt is pivoted in the design of FIGURE 8, both skirts may be made movable in this manner to achieve desired control effects through variation of the relative heights of the bottom edges of the skirts. As pointed out above, it is only the difference in height that has an effect on the pressure between the two skirts, so that, insofar as the apparent height of the horizontal surface is concerned, it is immaterial whether one or both of the skirts are moved. Rapid and effective control may be achieved where both inner and outer skirts are pivoted, but the control system necessarily becomes more complex when this is done.

As shown in FIGURE 9, there is a control member 86 connected to a fitting 87 mounted on the outer skirt 88. The control member 86 extends to a power cylinder so that the outer skirt 88 which connects the upper edge of the skirt 88 to the vehicle may be pivoted about the hinge 89. The inner skirt 90 also is pivoted about the hinge 89, being rotatable by a control member 91. The latter element extends to a power cylinder that is different from those for the outer skirt 88. Therefore, the two skirts can be operated independently, and may be moved in the same or opposite directions, or one can remain stationary while the other is pivoted.

In the arrangement of FIGURES 10 and 11, both the inner and outer skirts are rotatable but unlike the construction of FIGURE 9 they move together in a fixed relationship to each other. In this design, the outer skirt 92 and inner skirt 93 correspond to the outer and inner skirts 88 and 90 of the previously described embodiment. These two skirts 92 and 93 are pivotal relative to the vehicle structure about a longitudinal hinge 94 at the outer edge of the bottom surface 82 of the rigid float 78. A web 95 interconnects the skirts 92 and 93 adjacent the hinge 94 so that the two skirts must pivot together about the hinge. The pivotal movement is effected by a control element 96 connected to the inner skirt 90 at a fitting 97.

Normally, for vehicle control there are two or more of the movable skirt elements along each side edge of the vehicle. This permits fore and aft pitch control as well as roll control through the appropriate manipulation of the pivotal skirts. Consequently, there are two or more sets of the two rotationally interconnected skirts 92 and 93 at each side edge of the vehicle utilizing this arrangement. A perspective view of one of these units may be seen in FIGURE 11. At the ends of the skirts 92 and 93 are diaphragms 98 and 99 that interconnect the skirts. The bottom edges of the diaphragms are substantially on the level of the bottom edge 100 of the inner skirt 93. The diaphragms 98 and 99 significantly add to the efficiency of the control arrangement by minimizing end spillage of air from the pivotal skirt assembly. Thus, there is an open-bottom chamber defined between the skirts 92 and 93 and bounded at the ends by the diaphragms 98 and 99. Consequently, although one of the units of the skirts 92 and 93 may be pivoted relative to the unit next to it at the side of the vehicle, each of the units will retain the pressure that arises from the flow under the edge of the inner and outer skirts from the plenum chamber. The pressure is retained within the open-bottom chamber of the skirt assembly and not dissipated out at the ends by flow in that direction because the diaphragms 98 and 99 block such flow. This provision is one of the major advantages of the system utilizing the two rotationally coupled skirts 92 and 93 as shown in FIGURES 10 and 11.

Actually, some diaphragm arrangement may be provided at the end of each individually pivotal inner skirt 80 or 90 of the types shown in FIGURES 8 and 9. In all cases, the control is more effective when end leakage is prevented even though the outer skirt may be continuous when it is not a rotatable member. However, where there is relative rotational movement between the two skirts, as in the designs of FIGURES 8 and 9, it is more difficult to provide an effective closure element at the end of the movable element. There is no such problem, however, where the two skirts move together as in FIGURES 10 and 11, and a simple straight diaphragm will suffice.

Despite the fact that the two skirts are pivoted together in the design of FIGURES 10 and 11, it is necessary to obtain a change in elevation of the inner skirt relative to the outer, because this is what accomplishes the pressure change at the space between the skirts. This change in relative skirt height is accomplished through different rotational positions given the two skirts with respect to the hinge point 94. The inner skirt 93 extends angularly inwardly from the hinge so that, when the skirts are rotated, the inner edge 100 of the skirt 93 commences substantial change in elevation. On the other hand, the outer skirt 92 is more nearly vertical so that the bottom edge 101 of the outer skirt 92 is close to the outer edge of the craft and almost directly beneath the hinge 94. Therefore, when the outer skirt 92 begins its rotation, most of the movement of the edge 101 will be horizontal, while there will be a relatively small vertical component of motion. Consequently, when the skirts are moved, the bottom edge 100 of the inner skirt will move vertically much faster than the bottom edge of the outer skirt, so that the inner skirt will change its elevation relative to the outer, and the control effect can be achieved.

In order that the outer skirt 92 will not decrease its height as the pivoting motion takes place, the hinge 94 should be either directly above the bottom edge 101 of the outer skirt or slightly outboard of it as in the design shown. This means that when the outer skirt 92 moves, its bottom edge travels largely in a horizontal path with a small component of motion vertically upward, but there is no downward movement of the edge 101.

A means for varying the pressure between the inner and outer skirts at the edge of the vehicle may be seen in FIGURE 12. Here, there is an outer skirt 106, with an inner skirt 107 inclined toward the axis of the vehicle from the upper inner portion of the outer skirt 106. The inner skirt 107 is provided with an opening 108 through it. This opening is controlled by a variable spoiler flap 109 that is pivoted about a hinge 110 adjacent the upper edge of the inner skirt 107. An actuator rod 111 from a power cylinder 112 connects to the flap 109. Consequently, the flap 109 may be rotated about the hinge 110 by movement of the rod 111 by the power cylinder 112. In this manner, the opening 108 may be closed, opened, or varied in size. This, in turn, governs the flow permitted from the interior of the plenum chamber to the space between the skirts 106 and 107. Hence, particular control conditions may be accomplished by appropriate positioning of the spoiler vane 109.

Dual flexible skirts may be provided also at the bow and stern of the craft to provide several additional advantages. The construction of the bow may be seen in FIGURES 13 through 16. As illustrated, there is an outer skirt 113, which is rounded convexly providing a smooth contour for the forward end of the vehicle. Inside of the outer skirt 113 is an inner skirt 114, which is in two straight convergent sections 115 and 116. The skirt sections 115 and 116 extend to the midpoint of the outer flexible skirt 113 which is at the longitudinal axis of the vehicle. This provides the inner skirt 114 with a V-shaped contour. Chambers 117 and 118 are thereby provided between the skirt sections 115 and 116 and the outer skirt, respectively. At the rearward ends of the outer skirt, adjacent where it meets the corresponding ends of the inner skirt sections 115 and 116, are recesses 119 and 120 in the bottom edge portion of the outer skirt 113. The recesses 119 and 120 are of less depth than the height of the inner and outer skirts. This provides vent openings to the exterior from the chambers 117 and 118. It may be noted that the bottom edges of the skirt sections 115 and 116 are substantially at the same level as the bottom edge of the outer front skirt 113.

One of the advantages from the use of the double-skirt construction at the front is the suppression of water spray when the craft is operated over water, and of dust and dirt or other matter when the vehicle travels over land. The air exhausting beneath the edge of the skirts of the craft obviously stirs up water or dust, and can result in an objectionable cloud of such material. By the dual-skirt construction, these particles in a large measure are brought to rest by impinging upon the inner surface of the outer skirt 113. By venting the chambers 117 and 118 to the atmosphere through the openings 119 and 120, a pressure is realized in these chambers which is substantially less than that existing in the main chamber. Consequently, the velocity of the air escaping beneath the skirt sections 115 and 116 is relatively large and approaches that that would exist if the vehicle were provided with only a singe skirt at the bow. This effect is augmented by the positioning of the lower edges of the inner skirt sections approximately at the level of the lower edge of the outer skirt. Because the air achieves nearly its full velocity in flowing beneath the inner skirt, it is given very little acceleration upon subsequent passage under the bottom edge of the outer skirt 113. As a result, the particles thrown up by the escaping air will impinge upon the inner surface of the outerskirt 113. The particles will be brought to rest by striking the outer skirt wall, and will not be reaccelerated because of the relatively low increase in velocity of the air as it passes the bottom edge of the outer skirt. The V-shaped configuration of the inner skirt 114 directs what particles escape past the outer skirt 113 toward the side, so that they are not thrown up in front of the vehicle and do not interfere with visibility.

The same effect of spray suppression occurs at the double side skirts described above. Again, particles will strike the outer skirt and be brought to rest without being thrown up into a cloud at the outside of the vehicle. With the dual side skirt construction, normally the inner skirt is relatively higher than it is in the case of the inner skirt at the front. Consequently, there is less spray and dust suppression at the sides than at the front. However, it is much less objectionable to create a certain amount of spray or dust at the side of the vehicle than at the front, so that the reduced suppression at the sides is not objectionable.

The conditions at the bow of the vehicle with the dual front skirt arrangement are different at low velocities over water from the conditions existing at higher speeds. When the vehicle is moving slowly or is motionless, and air is flowing through the lift chamber, the vehicle will ride over a depression in the water. This occurs because the air pressure displaces the water beneath the vehicle so that in this area the surface of the water is indented. Thus, as indicated in FIGURE 17, the free water level will be along the line B, while beneath the vehicle the pressure displaces the water to the lower level indicated by the line C. Consequently, the bottom edges of the skirts actually are below the free water level. Because of the upwardly sloping water surface D at the side edges of the vehicle where the water level rises from the level C to the free water level B, the side vents 119 and 120 will be partially obstructed. This reduces the amount of air that escapes through the vents 119 and 120. Therefore, at low vehicle speeds a positive pressure will occur in the chambers 117 and 118 between the inner and outer forward skirts. This pressure helps lift the forward end of the vehicle, thereby augmenting the total lift produced. This lifting force helps free the forward skirts from the surface of the water, reducing the water drag at low speeds.

The dual front skirt design also enhances the stability of the craft in the same manner as the lower effective chamber height does at the sides of the vehicle, as described above. Nevertheless, spray suppression is fully effective. This is because the spray will strike the sloping water surface portions D defined by the sides of the depression in the water, where the spray will be brought to rest rather than rising upwardly in front of the vehicle. Also, the V-shaped configuration of the inner skirt at the bow directs the spray to the side so that it does not rise up in front of the vehicle.

At higher speeds the depression in the water surface beneath the vehicle largely disappears. This is because of the inertia of the water which cannot be displaced by the pressure from the craft before the rapidly moving vehicle has passed over it. Therefore, the side vents 119 and 120 are no longer obstructed by upwardly inclining water surfaces adjacent to them. The greater venting effect lowers the pressure between the inner and outer skirts so that the air accelerates almost to full velocity as it passes under the inner skirt. Consequently, as described above, there is full opportunity for the particles to impinge on the inner wall of the outer front skirt, where they are brought to rest. The same effect is realized over a hard surface. Therefore, the dual front skirt arrangement of this invention provides added lift and stability when it is needed at the low velocities of the craft, while reducing the water drag at higher speeds where the added lift is not required. The effect changes automatically.

Figure 14:
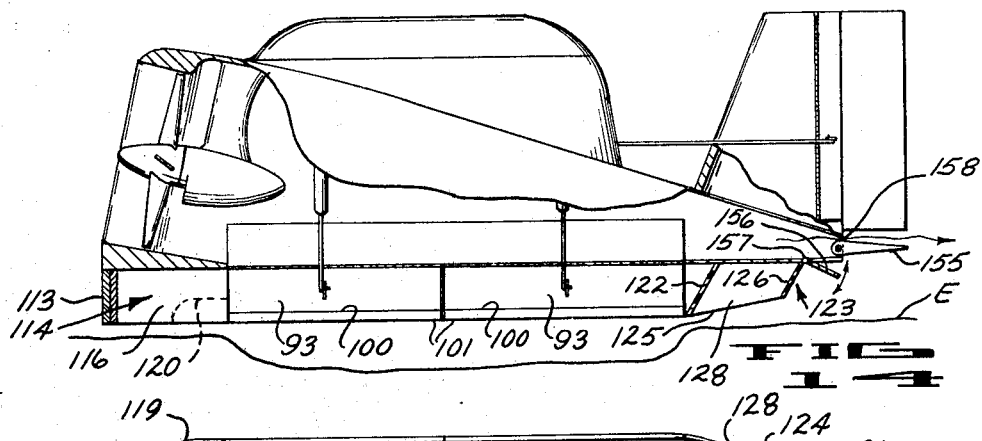
FIGURE 14 is a longitudinal sectional view taken along line 14—14 of FIGURE 13.
Figure 15:
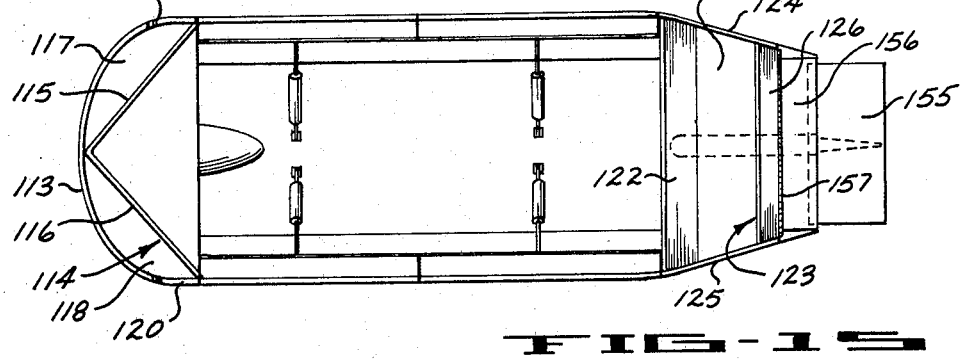
FIGURE 15 is a bottom plan view of the vehicle of FIGURE 14.

At the stern of the vehicle there is a main rear skirt 122 extending transversely to interconnect the side edges of the craft, as seen in FIGURES 14 and 15. Beyond this is an auxiliary skirt 123 which extends beneath the rearward portion of the vehicle beyond the lift chamber. The skirt 123 is substantially U-shaped, including side portions 124 and 125 interconnected by an aft skirt section 126. The skirt portions 124 and 125 may be made slightly convergent, as shown in FIGURE 15, to conform to the general contour of the vehicle. The auxiliary skirt 123 has an upswept configuration resulting from the fact that the rearward skirt section 126 is shorter than the main rear skirt 122. Consequently, the bottom edges of the side skirt portions 124 and 125 incline upwardly from the bottom edge of the main rear skirt to the bottom edge of the aft rear skirt portion 126. As with the other skirts, the rear skirt elements 122 and 123 are made of flexibile material, being beneath the rigid structure of the craft.

At low speeds over water the stern of the vehicle drops downwardly as the bow rises. This provides a water level line E with respect to the vehicle, as may be seen in FIGURE 14. The shape of the depression in the water, therefore, causes air flowing under the rear wall 122 to be deflected upwardly. Consequently, a positive pressure is created in the chamber 128 defined by the skirts 122 and 123. As a result, air-cushion pressure is experienced throughout the area beneath the chamber 128. This has the effect of increasing both the length and the area of the lift chamber, as the chamber 128 now forms a portion of it. Consequently, this added lift helps raise the stern of the vehicle above the surface of the water. This significantly reduces the peak water drag which normally occurs just at the speed when the bottom of the depression in the water is opposite the rear of the lift chamber. With positive pressure in the auxiliary chamber 128, the vehicle is lifted clear of the water at an earlier time, and the peak water drag is diminished.

At higher speeds water drag disappears, so that there is no need for the added lift chamber, length and area. As noted above, the water beneath the vehicle is virtually flat at greater velocities, so that there is no inclined water surface to deflect air toward the chamber 128. Consequently, the positive pressure in the chamber 128 disappears. This returns the lift chamber to its normal size. The air escaping beneath the main rear skirt 122 under these conditions does not strike the auxiliary skirt 123 because of the upswept configuration of the latter element. Thus, because the bottom edges of the side skirt sections 124 and 125 incline upwardly to the rearward skirt section 126, the air flowing beneath the main rear skirt 122 does not wash the auxiliary skirt at the rear. This assures that a negative pressure is not induced in the chamber 128 as might otherwise be the case. Moreover, the presence of the auxiliary skirt 123 fills in the space behind the bulff inner skirt 122 to achieve some reduction in aerodynamic drag. In addition, the upswept configuration of the aft auxiliary skirt 123 keeps it clear of the water surface even in steep waves. This helps the vehicle maintain its speed in adverse seas.

The craft may be given added maneuverability over water if constructed as illustrated in FIGURES 18 and 19. Here, there is provided an elongated lift chamber 129 extending longitudinally from the aft end of the normal lift chamber 130. The chamber 129 includes a pair of convergent side walls 131 and 132 connecting to parallel closely spaced side walls 133 and 134, which in turn are joined by a short transverse end wall 135. This provides the lift chamber 129 with a long and narrow configuration, extending from the central axis of the vehicle behind the rear wall 137 of the normal lift chamber 130. The elongated lift chamber 129 connects to the main lift chamber 130 through a vertical slot 138 in the rear chamber wall 137.

A localized area of high pressure at the stern of the vehicle is produced by the lift chamber 129. Consequently, even at higher velocities the water will be depressed immediately beneath the elongated chamber 129. This depression in the water created by the air in the chamber 129 causes a resistance to the movement of the aft end of the craft in a lateral direction. The result is the effect of a keel resisting sideward motion of the vehicle. At the same time, there is no contact with water as with a conventional keel or rudder. Therefore, water drag is avoided even though the resistance to sideward movement is accomplished.

The elongated chamber 129 also may be used as a means for turning the craft through the inclusion of double-acting hinges 139 and 140 that permit at least a portion of the chamber 129 to be moved rotationally. Therefore, when the aft portion of the chamber 129 is turned to one side, a lateral force is developed to turn the craft. Hence, the rudder effect is achieved, and the vehicle may be steered through appropriate rotation of the chamber 129.

Figure 20:
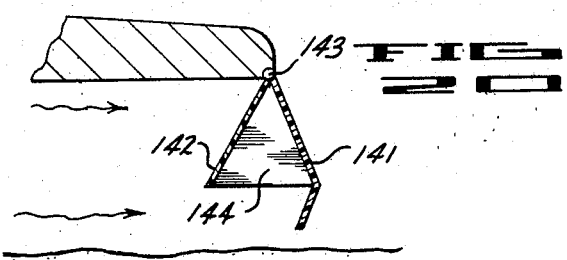
FIGURE 20 is a fragmentary longitudinal sectional view of an adjustable rear flap assembly that incorporates a flexible inner skirt.

Another arrangement for the aft portion of the craft is shown in FIGURE 20, where the dual skirt concept is applied to a portion of the span of the flap at the rear of the plenum chamber. The rear control flap, which corresponds to the flap 20 of the arrangement of FIGURE 2, or a segment of that flap, includes an outer control flap 141 to which is connected a flexible inner skirt 142, pivotal with the flap 141 about the hinge 143. Flexible diaphragms 144 seal off the ends of the space between the flap 141 and the inner skirt 142. The inner skirt is arranged slightly ahead of the hinge 143 so that its travel is mostly horizontal and it remains approximately a constant distance above the surface below the craft as the flap assembly is deflected.

The chamber between the inner skirt and the flap is under pressure as the air from the plenum chamber flows beneath it. This provides a stabilizing effect. Normally raising the rear flap causes the craft to settle at the stern, but this pressure area counteracts that tendency. The dual skirt rear flap also helps stabilize the vehicle under other operating conditions.

The effectiveness of the controls of the craft may be enhanced materially with the construction shown in FIGURES 13, 14, 15, 21 and 22, wherein some of the air from the plenum chamber is bled off to discharge adjacent the control surface. As illustrated, the vertical stabilizer 145 is hollow and receives air through an opening 146 at the aft end of the lift chamber. The trailing edge portion of the stabilizer 145 is defined by a pair of flaps 147 and 147a that are pivotal about hinges 148 and 149. The trailing edge of each of these flaps is adjacent the leading edge of the rudder 150 that is pivotal relative to the stabilizer about a hinge 151. Control connections 152 and 153 are provided on the flaps 147 and 147a so that these flaps may be pivoted about their hinges 148 and 149, such as indicated in phantom in FIGURE 22. When moved outwardly from the solid-line position, the flaps provide openings at the trailing edge of the vertical stabilizer, discharging the air that enters the stabilizer from the opening 146 that connects to the lift chamber. Turning vanes 154 may be provided within the hollow stabilizer to direct this air substantially horizontally to the rear.

This provides several advantages in the control of the vehicle. With the rudder 150 totally immersed in the stream of air discharging from the trailing edge of the stabilizer, it can provide an effective control under all flight conditions. The air discharging from the stabilizer acts as a jet which can be deflected by the rudder in either direction. This produces a jet reaction force on the stern of the vehicle which will turn the vehicle when it is traveling at very slow velocities or is not moving forwardly. Also, the jet from the air discharging from the stabilizer augments the aerodynamic forces on the rudder that provide control. With the air velocity past the rudder increased through the jet discharge, the aerodynamic forces generated by pivoting the rudder similarly are made greater. Thus, the ability to control the vehicle is enhanced. The jet at the trailing edge of the stabilizer increases the effective area of the rudder and also increases the effective area of the stabilizer. The stabilizing effect is greatly augmented when the stabilizer is at an angle to the wind direction. The jet discharging to the rear of the stabilizer acts as a physical barrier to the flow of the free stream air, in that manner increasing the effective area of the stabilizer fin. In addition to the added control effects, the air jet exhausting in the rear produces a useful forward jet thrust that helps propel the vehicle.

One advantage of the arrangement of FIGURES 21 and 22 with the pivotal flaps 147 and 147a lies in the fact that the amount of air discharging through the trailing edge of the stabilizer may be controlled so that the appropriate effect can be realized when needed, but the jet may be diminished or closed off to conserve all air for lifting when this is desired. By opening the flaps 147 and 147a outwardly, the air discharging from the stabilizer increases, and, of course, when they are closed to the solid-lint position of FIGURE 22, the air flow is shut off and no air will bleed from the lift chamber to the stabilizer.

Also, as seen in FIGURE 14, a controlled quantity of air from the lift chamber can be allowed to pass under the elevator 155 through the opening of a flap 156 that is pivotal about a transverse hinge 157. The control augmentation is similar for the elevator to that described above with regard to the rudder. In addition to the air flow allowed by opening the flap 156, a small aperture 158 allows some air to flow from the lift chamber over the flap of the elevator 155. If desired a flap similar to the flap 156 can be included to permit control of the flow of air over both surfaces of the elevator.

An additional control means may be provided for the vehicle through the arrangement illustrated in FIGURE 23. In this construction, there is mounted at the bottom of the axial flow plenum chamber an array of thrust control vanes 159. These extend transversely of the plenum chamber and are pivotal about hinges 160. The leading edge of one vane 159 is adjacent the trailing edge of the vane next to it. The vanes are pivotal, therefore, between a horizontal position in which they substantially close off a major portion of the bottom of the plenum chamber, and a vertical position in which substantially the full area of the bottom of the plenum chamber is open. Normally, they will be at an intermediate position, as shown in solid lines, in which they are inclined only slightly downwardly, providing apertures 161 between adjacent vanes.

These thrust control vanes have the primary function of a nozzle or flow-metering device. In this respect, their purpose is to control the flow area through the plenum chamber, rather than the direction of air movement. If the vanes are moved to the closed position, the flow area through the plenum chamber is decreased, while the dynamic pressure and thus the jet total pressure are increased. Opening of the vanes increases the flow area, decreasing the velocity and dynamic pressure. This decreases the jet total pressure for a constant plenum chamber pressure. Only a small deflection of the vanes is necessary in making a large change in the ratio of plenum chamber pressure to jet total pressure to achieve a desired control effect, such as to govern the height of the vehicle or its velocity. The direction of the travel of the air, however, is changed only slightly because of the small deflection of the vanes that is required for this type of control.

For low speed or reverse flight, however, a large deflection of the thrust control vanes is needed. Moving the vanes substantially to the vertical position will change the direction of the air flow, deflecting a large portion of it downwardly in a vertical path beneath the vehicle. This permits the device to hover when the vanes 150 are pivoted a substantial amount from their normal nearly horizontal position. When the vanes 159 are moved through their full arc, the change in air flow direction will shift the center of lift forward of its normal position. Consequently, when the vanes are rotated to the vertical position, the increased lift at the forward end of the vehicle tends to raise its nose. This in turn helps in providing reverse thrust when backward movement is to be accomplished.

In view of their location at the lower portion of the plenum chamber, normally at least the rearward parts of the thrust control vanes are made of flexible material. This, as for the flexible skirts, precludes damage from contact with objects beneath the craft.

Extremely high velocities with high surface clearance may be accomplished utilizing the axial flow plenum chamber principle of this invention in an arrangement such as that shown in FIGURES 24 and 25. The craft 162 includes a jet power plant 163, which in the embodiment illustrated is a rocket combustion chamber. Alternatively, an atmospheric jet propulsion engine, such as a turbojet or a ramjet, could be used. A nozzle 164 exhausts the gases from the chamber 163, employing into the plenum chamber 165. The nozzle 164 is of convergent-divergent shape, so that supersonic velocities will be realized prior to discharge into the plenum chamber. The chamber 165 and the nozzle have generally rectangular cross sections, The upper wall 166 of the chamber 165 which forms a continuation of the upper wall of the nozzle 164, inclines downwardly toward the aft end 168 and the rearward skirt 169, thereby gradually reducing the cross-sectional area of the plenum chamber to maintain substantially constant velocity through it as gas escapes to the sides. Skirts 167 depend from the bottom edges of the chamber 165, and may be generally of the type described above. Aft of the plenum chamber, the craft is provided with an upwardly inclined lower surface 170. This forms an additional expansion surface for the jet, permitting velocities to increase. The surface 170 together with the surface beneath the vehicle approximates a divergent nozzle to allow the acceleration of the gases.

Because of the characteristics of supersonic flow, which increases in velocity with increasing cross-sectional area, high surface clearances are provided beneath the craft with relatively low mass flows of gas. The result is a vehicle that not only can travel at high speeds, but also which is efficient in utilizing the energy supplied to it.

The vehicle 162 is usable for a variety of purposes. For example, it may operate as a missile or aircraft after an initial period of acceleration as a ground effect machine. This permits substantially horizontal rocket launching, inherently a more efficient type than vertical rocket launching. This is because it is not necessary to overcome the force of gravity as the rocket launching takes place. Moreover, this type of device can provide efficient and rapid transportation when in a vacuum, making it ideally suited for travel over a celestial body, such as the moon. Supersonic velocity is readily achieved in a vacuum, with very low gas pressure. When large surface clearance is important, a high pressure source may be expanded to very low pressures in the lift chamber to achieve this result.

When the vehicle is being launched in the horizontal direction, it may be desired to provide a thrust deflector surface 172 adjacent the aft end of the plenum chamber. When this surface is pivoted downwardly, it deflects the flow of the gas to propel the craft upward. The surface 172 may be pivoted downwardly at the end of the take-off run to cause the vehicle to rise.

In addition, an auxiliary rocket or other jet power plant 173 may be included. This is inclined forwardly and communicates with the upper wall 166 of the chamber 165. The auxiliary power plant 173 permits braking of the vehicle by providing a jet reaction to urge the craft in the rearward direction. Also, when combined with the main gas flow from the combustion chamber 163, it allows vertical flight of the vehicle.

Illustrated in FIGURES 27–30 is an embodiment of the ground effect machine of this invention that incorporates a number of the design features discussed above. Thus, a vehicle may be constructed that is a composite of many of the individual features which have been described individually. The craft of FIGURES 27–30 includes a body having sidewalls 174 and 175, a top wall 176 and a front wall 177. The lower rear wall is defined by the skirts 141 and 142. Together, the walls define a chamber 178. In the front wall 177 are air intake openings 26 and 27 as in the embodiment of FIGURE 5. Air from both intakes discharges into the single plenum chamber 178. The vehicle operates in the same manner regardless of the number of intakes. Multiengine construction is preferred primarily in larger sizes to increase the volume of air brought into the plenum chamber, but selection of the number of engines generally is a matter of design preference.

The foregoing detailed description is to be clearly understood as given by way of illustration and example only, the spirit and scope of this invention being limited solely by the appended claims.

I claim:
1. A ground effect machine comprising
  a body defining an elongated chamber,
    said chamber having an open bottom, a top wall and spaced side walls,
  one end of said chamber having an exit aperture at the lower edge thereof,
    said top wall being spaced a relatively great distance from said open bottom and having a substantially constant inclination toward said one end of said chamber,
  said chamber including a plurality of openings remote from said end and substantially aligned therewith,
  and means at each of said openings for pumping air therethrough and into said chamber.
2. A device as recited in claim 1 including in addition an inlet duct extending inwardly from each of said openings into said chamber,
  said ducts being inclined downwardly at a relatively shallow angle toward said open bottom side.
3. A device as recited in claim 1 in which
said openings are arranged one behind the other longitudinally of said chamber.
4. A device as recited in claim 1 in which
said chamber includes additional opening means adjacent said plurality of openings,
and including in addition adjustable restrictor means in each of said additional opening means and in said exit aperture
  for thereby controlling the flow into and out of said chamber and the thrust of said machine.

5. A ground effect machine comprising
a body defining an elongated chamber,
said chamber having a longitudinally extending top wall, a front end wall, a rear end wall, and a duality of side walls extending between said end walls and depending from said top wall,
said chamber having an open bottom,
said front wall having at least one relatively large opening therein,
means at said opening for pumping air through said opening into said chamber for discharge at said rear end wall,
an outer skirt depending from each of said side walls,
an inner skirt inwardly of each of said outer skirts,
said skirts being of substantially flexible material,
said inner skirt having a bottom edge laterally inwardly of the bottom edge of said outer skirt,
said bottom edge of said inner skirt normally being vertically above said bottom edge of said outer skirt,
and means for controlling the relative vertical positions of said bottom edges of said inner and outer skirts.

6. A device as recited in claim 5 including in addition a float along either side wall of said chamber,
said floats providing longitudinally extending substantially horizontal surfaces at either of said side walls,
said surfaces being above said skirts.

7. A ground effect machine comprising
a body defining an elongated chamber,
said chamber having an open bottom, a top wall, and spaced longitudinally extending side walls,
said chamber having a front end provided with at least one opening therethrough,
means for pumping air through said opening into said chamber for discharge at the opposite end of said chamber,
a longitudinally extending substantially rigid surface means at each side wall of said chamber beneath said top wall,
a depending outer skirt extending beneath said surface means,
said outer skirit having an inwardly inclined bottom edge portion,
an inner skirt depending beneath said surface means,
said inner skirt having a bottom edge laterally inwardly of and vertically above the bottom edge of said outer skirt,
said skirts being of substantially flexible material,
and means pivotally connecting said inner skirt to said body for permitting adjustment of said bottom edge of said inner skirt vertically relative to said bottom edge of said outer skirt.

8. A device as recited in claim 7 in which said means pivotally connecting said skirt to said body includes
a hinge adjacent said outer skirt upwardly of said bottom edge of said outer skirit,
said inner skirt inclining inwardly toward the longitudinal axis of said body and downwardly from said hinge.

9. A device as recited in claim 8 including in addition means for pivotally connecting said outer skirt to said body for permitting pivotal movement of both of said skirts.

10. A ground effect machine comprising
a body defining an elongated chamber,
said chamber having an open bottom, a top wall, and spaced side walls,
said chamber having a forward end wall provided with at least one opening therethrough,
means for pumping air through said opening into said chamber for discharge at the opposite end of said chamber,
a substantially rigid surface means in said body extending longitudinally thereof beneath said top wall and adjacent said side walls,
and a plurality of skirt assemblies along either side of said body beneath said surface means,
each of said skirt assemblies being of substantially flexible material and including
a downwardly extending outer skirt,
a downwardly extending inner skirt,
said skirts having spaced bottom edges, the bottom edge of said inner skirt being above said bottom edge of said outer skirt,
and means interconnecting the ends of said skirts for providing open-bottomed chambers between said inner and outer skirts,
means pivotally connecting said skirt assemblies to said body adjacent said side walls beneath said surface means,
and means for pivoting said skirts for controlling the effective distance of said bottom edge of said inner skirt from said surface means and said bottom edge of said outer skirt.

11. A device as recited in claim 10 in which said means for pivotally connecting said skirt assemblies to said body includes
a longitudinally extending hinge means for each of said skirts adjacent the side edge of said body,
said skirts being equally and simultaneously movable about said hinge means.

12. A device as recited in claim 11 in which said outer skirt includes
a substantially vertically extending main portion and and inwardly inclined bottom portion terminating in said bottom edge,
and in which said inner skirt inclines inwardly toward the longitudinal axis of said body and downwardly from said hinge means.

13. A ground effect machine comprising
a body
having a top wall, side walls, a front wall and a rear wall defining an open-bottomed chamber,
means providing pressurized gas in said chamber for providing a lifting force on said body,
an outer skirt extending transversely of said body below said front wall,
an inner skirt extending transversely of said body adjacent and inwardly of said outer skirt so as to provide a space between said inner and outer skirts,
and vent means for venting said space to atmosphere.

14. A device as recited in claim 13 in which said inner and outer skirts have bottom edges substantially at the same height.

15. A ground effect machine comprising
a body having a top wall, side walls, and end walls defining an open-bottomed chamber,
one of said end walls having at least one opening therethrough,
means at said opening for pumping air through said opening into said chamber for discharge therefrom at the opposite end wall,
and skirt means depending beneath said one end,
said skirt means including an outer skirt extending across said one end,
and an inner skirt inwardly of said outer skirt,
said inner skirt having a substantially V-shaped configuration with its apex adjacent said outer skirt at the longitudinal axis of said body,
said outer skirt including vent means for venting pressure from between said inner and outer skirts.

16. A device as recited in claim 15 in which
said outer skirt is generally rounded and interconnects said side walls,
the outer edges of said inner skirt extending to the outer edges of said outer skirt at said side walls, and in which said vent means includes a recess in the bottom edge of said outer skirt on either side of said outer skirt adjacent the juncture thereof with the outer end of the inner skirt.

17. A ground effect machine comprising
a body defining an open-bottomed chamber,
said chamber having a forward end and a rearward end,
means for pumping air through said forward end to discharge into said chamber toward said opposite end for providing a lifting force and a propulsive force for said body,
said body extending aft of said rearward end of said chamber
and providing a transversely extending surface above the bottom edge of said rearward end of said chamber,
and a skirt depending from said transversley extending surface,
said skirt having side portions connected to said rearward end of said chamber and extending to the rear thereof,
and a transverse portion interconnecting the opposite ends of said side portions,
the bottom edges of said skirt side portions being upswept from the rearward end of said chamber to said transverse skirt portion.

18. A ground effect machine comprising
a body defining an open-bottomed chamber,
said chamber having a forward end and a rearward end,
means for pumping air through said forward end into said chamber for discharge adjacent said rearward end,
an array of a plurality of vanes extending transversely of said chamber above a substantial portion of the open bottom thereof,
and means for pivotally mounting said vanes about transverse axes,
said vanes having adjacent front and rear edges and being positionable generally in a horizontal attitude for substantially closing a portion of the bottom of said chamber and being positionable in a substantially vertical attitude for opening the bottom of said chamber,
whereby said vanes can be adjusted to control the discharge area through said chamber and when moved to said substantially vertical position will deflect air from said pumping means downwardly through said open bottom of said chamber.

19. A ground effect machine comprising
a body
having a top wall, side walls, a front wall and a rear wall defining an open-bottomed chamber,
means for producing a flow of pressurized gas in said chamber directed rearwardly from the vicinity of said front wall toward the lower portion of said rear wall, and a flap assembly normally defining the lower portion of said rear wall for controlling an exit opening for said pressurized gas,
said flap assembly including an outer transverse flap,
a transverse skirt inwardly of said flap,
a transverse hinge means at the upper portions of said flap and skirt for connecting said flap and skirt to said body for pivotal movement about a transverse axis,
and closure means interconnecting the adjacent end edges of said flap and skirt for substantially preventing flow of said gas past the ends of said flap and skirt.

20. A device as recited in claim 19 in which the bottom edge of said skirt is inwardly of said hinge means and relatively close thereto,
whereby upon pivoting of said flap assembly said bottom edge of said skirt moves primarily in a horizontal direction.

21. A ground effect machine comprising
an elongated receptacle,
said receptacle having a longitudinally extending top walls,
a front end wall,
a rear end wall,
and a duality of side walls extending between said end walls and depending from said top wall,
said receptacle having an open bottom,
said top wall being spaced a relatively great distance from said open bottom throughout the length thereof between said front end wall and said rear end wall,
said rear wall having an opening adjacent the bottom edge thereof for discharging air from said receptacle,
said front wall having at least one relatively large opening therein,
fan means in said opening in said front wall for pumping a relatively large mass of air at relatively low velocity into said receptacle for movement therethrough to said discharge opening and through said open bottom in a substantially longitudinal direction,
a plurality of vanes in said receptacle extending transversely with respect thereto inwardly of said fan means and intermediate said end walls,
and means for moving said vanes about axes transverse of said receptacle for causing said vanes selectively to influence the movement of air in said receptacle to vary the velocity of said air through said discharge opening and through said open bottom.

22. A ground effect machine comprising
an elongated receptacle,
said receptacle having a longitudinally extending to wall,
a front end wall,
a rear end wall,
and a duality of side walls extending between said end walls and depending from said top wall,
said recepetacle having an open bottom,
said top wall being spaced a relatively great distance from said open bottom throughout the length thereof between said front end wall and said rear end wall,
said rear wall having an opening adjacent the bottom edge thereof for discharging air from said receptacle,
said front wall having at least one relatively large opening thereon,
fan means in said opening in said front wall for pumping a relatively large mass of air at relatively low velocity into said receptacle for movement therethrough to said discharge opening and through said open bottom in a substantially longitudinal direction,
an elongated yieldable flap at the bottom edge of either side wall,
and means for selectively moving said flaps upwardly for controlling the roll of said ground effect machine.

23. A ground effect machine comprising
an elongated receptacle,
said receptacle having a longitudinally extending top wall,
a front end wall,
a rear end wall,
and a duality of side walls extending between said end walls and depending from said top wall, said receptacle having an open bottom,
said top wall being spaced a relatively great distance from said open bottom throughout the length thereof between said front end wall and said rear end wall, said rear wall having an opening adjacent the bottom edge thereof for discharging air from said receptacle, said front wall having at least one relatively large opening therein, fan means in said opening in said front wall for pumping a relatively large mass of air at relatively low velocity into said receptacle for movement therethrough to said discharge opening and through said open bottom in a substantially longitudinal direction, at least two elongated flaps at the bottom edge of either side wall, and means for selectively moving said flaps upwardly individually and together for controlling the pitch and roll of said ground effect machine.

24. A ground effect machine comprising
a body
having a top wall and side walls defining an open-bottomed chamber,
means for introducing pressurized gas into said chamber for providing a lifting force on said body,
and to discharge through the bottom of said chamber for contributing thrust to said body,
skirt means depending from at least a portion of the bottom edge of said chamber,
said skirt means including an outer skirt and an inner skirt,
said inner skirt having a bottom edge inwardly of the bottom edge of said outer skirt,
said skirt means being of yieldable material for yielding upon impact with an adjacent surface to prevent transmittal of substantial forces to remaining portions of said machine,
and means for varying the height of said bottom edge of said inner skirt relative to the height of said bottom edge of said outer skirt.

25. A device as recited in claim 24 in which said means for varying the height of said inner skirt relative to said outer skirt includes
a hinge adjacent said portion of the bottom edge of said chamber,
said inner skirt having an upper edge portion pivotally connected to said body said hinge, whereby said inner skirt is pivotally mounted on said body.

26. A ground effect machine comprising
a body defining an open-bottomed chamber,
said chamber having a forward end and a rearward end,
means for introducing pressurized air into said chamber for providing a lifting force on said body,
a vertical stabilizer on said body adjacent said rearward end,
said vertical stabilizer having passage means interiorly thereof
and being provided with a rearward edge having a discharge opening for said passage means for discharging rearwardly therefrom,
means interconnecting said passage means and said chamber for conducting air from said chamber through said passage means to discharge through said discharge opening,
and a rudder adjacent said rearward edge of said vertical stabilizer in the path of air discharged from said discharge opening,
said rudder being located so that air discharged from said opening flows over said rudder irrespective of the position of said rudder for thereby increasing the effectiveness of said rudder.

27. A ground effect machine comprising
a body defining an open-bottomed chamber,
said chamber having a forward end and a rearward end,
means for introducing pressurized air into said chamber for providing a lifting force on said body,
a vertical stabilizer on said body adjacent said rearward end,
said vertical stabilizer having passage means interiorly thereof
and being provided with a rearward edge having a discharge opening for said passage means,
means interconnecting said passage means and said chamber for conducting air from said chamber through said passage means to discharge through said discharge opening,
a rudder adjacent said rearward edge of said vertical stabilizer in the path of air discharged from said discharge opening for thereby increasing the effectiveness of said rudder,
and control means on either side of said vertical stabilizer for controlling the amount of air discharged through said opening on either side of said rudder irrespective of the position of said rudder.

28. A ground effect machine comprising
a body defining an open-bottomed chamber,
said chamber having a forward end and a rearward end,
means for introducing pressurized air into said chamber for providing a lifting force on said body,
a vertical stabilizer on said body adjacent said rearward end,
said vertical stabilizer having passage means interiorly thereof
and being provided with a rearward edge having a discharge opening for said passage means,
means interconnecting said passage means and said chamber for conducting air from said chamber through said passage means to discharge through said discharge opening,
a rudder adjacent said rearward edge of said vertical stabilizer in the path of air discharged from said discharge opening for thereby increasing the effectiveness of said rudder,
and control means on either side of said vertical stabilizer for controllying the amount of air discharged through said opening on either side of said rubber,
said control means including
a flap on either side of said vertical stabilizer,
means pivotally connecting each of said flaps about an upwardly extending axis adjacent the forward end of each of said flaps,
and means for effecting rotation of said flaps for controlling the spacing between the rearward ends of said flaps and thereby governing the size of said discharge opening.

29. A skirt device for use with a ground effect machine comprising
a first flap,
a second flap,
said flaps having spaced bottom edges defining an opening therebetween,
said flaps including walls interconnecting spaced portions thereof so that said flaps upwardly of said bottom edges define an enclosed chamber, whereby said flaps at said opening provide substantially the effect of a horizontal surface at said opening when said skirt device is employed at the edge of a ground effect machine lift chamber,
said flaps being of flexible material,
said bottom edge of one of said flaps being higher than said bottom edge of the other of said flaps,
and means for varying the relative height of said bottom edge of said one flap above said bottom edge of said other flap for controlling the attitude of a ground effect machine with which said skirt device is associated.

References Cited

UNITED STATES PATENTS

| | | | |
|---|---|---|---|
| 2,387,627 | 10/1945 | Warner | 180—7 |
| 2,444,318 | 6/1948 | Warner | 180—7 |
| 3,066,753 | 12/1962 | Hurley et al. | 180—7 |
| 3,116,897 | 1/1964 | Theed | 180—7 |
| 3,229,781 | 9/1965 | Crowley | 180—7 |
| 3,249,165 | 5/1966 | Chaplin | 180—7 |
| 3,262,510 | 7/1966 | Froehler | 180—7 |
| 3,267,898 | 8/1966 | Evans | 180—7 X |

A. HARRY LEVY, Primary Examiner

U.S. Cl. X.R.

180—126, 127; 244—12, 23

PO-1050
(5/69)

UNITED STATES PATENT OFFICE
CERTIFICATE OF CORRECTION

Patent No. 3,486,577　　　　　　　Dated Dec. 30, 1969

Inventor(s) Arthur M. Jackes

It is certified that error appears in the above-identified patent and that said Letters Patent are hereby corrected as shown below:

Column 21, line 19, change "transversley" to -- transversely --.
Column 22, line 40, change "to" to -- top --; line 45, change "recepetacle" to -- receptacle --. Column 23, line 45, after "body" insert -- by --. Column 24, line 42, change "controllying" to -- controlling --; line 43, change "rubber" to -- rudder --.

SIGNED AND
SEALED
JUN 9 1970

(SEAL)
Attest:

Edward M. Fletcher, Jr.
Attesting Officer

WILLIAM E. SCHUYLER, JR.
Commissioner of Patents